S. T SANFORD.
Carriage-Fender.

No. 12,218.

Patented Jan. 9, 1855.

UNITED STATES PATENT OFFICE.

SAMUEL T. SANFORD, OF FALL RIVER, MASSACHUSETTS.

CARRIAGE-CRAMP.

Specification of Letters Patent No. 12,218, dated January 9, 1855.

*To all whom it may concern:*

Be it known that I, SAMUEL T. SANFORD, of Fall River, in the county of Bristol and State of Massachusetts, have invented a new and Improved Carriage-Cramp; and I do hereby declare that the following is a full, clear, and exact description of the same, reference being had to the annexed drawings, making a part of this specification, in which—

Figure 1:
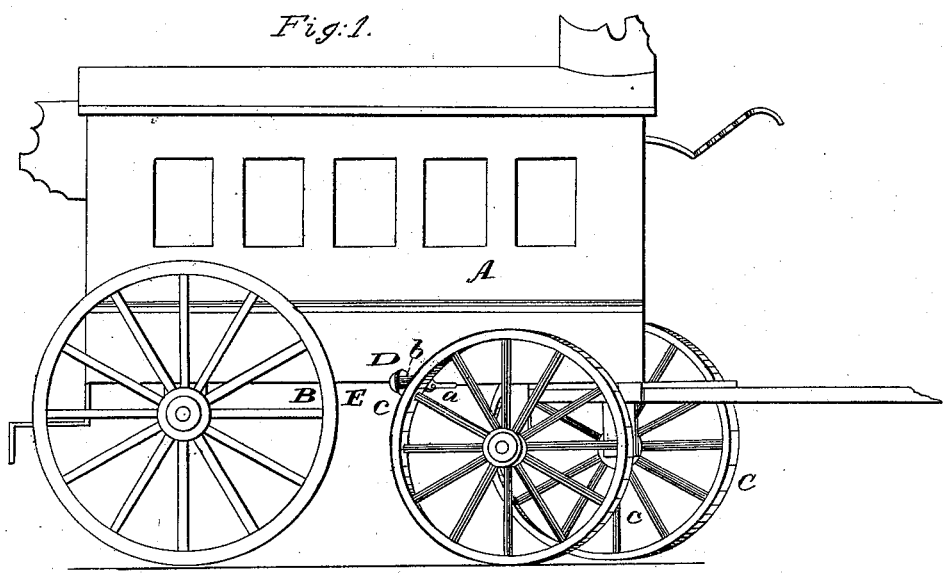
Figure 2:
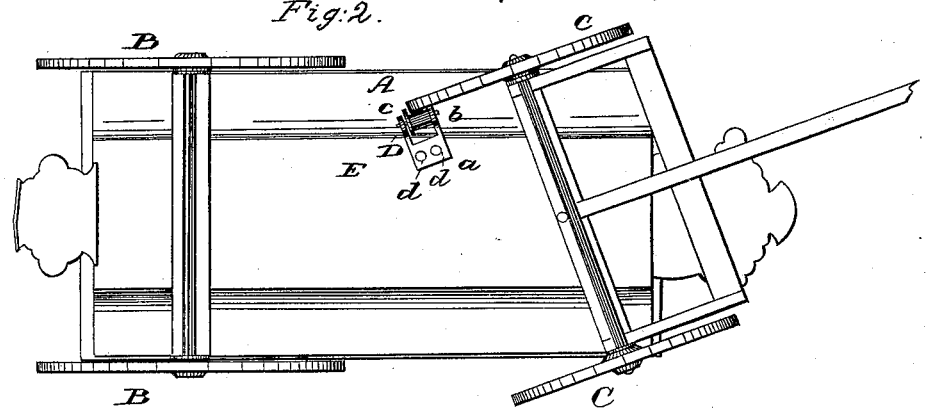

Figure 1 is a side view of a vehicle with my improvement applied to it. Fig. 2 is an inverted plane of ditto.

Similar letters of reference indicate corresponding parts in the two figures.

The nature of my invention consists in constructing the cramps with anti-friction rollers of peculiar form so that the peripheries of the tires and the sides of the fellies of the wheels will when the vehicle is turned come in contact with said rollers and prevent the vehicle from being upset and also prevent the great friction attending the ordinary cramps in present use.

To enable others skilled in the art to fully understand and construct my invention I will proceed to describe it.

A represents a vehicle constructed in any of the known forms, and B, B, are its back wheels and C, C its front wheels, the front wheels as usual being smaller in diameter than the back wheels so that they may be cramped or turned sufficiently to allow the vehicle to turn within a suitable compass.

D represents a cramp. Only one is shown, attached to one side of the bottom E of the body of the vehicle. The clamps are constructed of a frame (*a*) having an antifriction roller (*b*) secured to its outer end, said roller having a flange (*c*) at one end, the flange projecting at right angles with the periphery of the roller (*b*). The frame (*a*) is secured to the bottom E by bolts or rivets (*d*) and in an oblique position as shown in Fig. 2, the outer end of the frame (*a*) pointing toward the periphery of one of the back wheels B. By having the frame (*a*) in this position the tires of the front wheels, when the front wheels are cramped, will press against the flange (*c*) of the rollers (*b*) while the sides of the fellies and tires will bear against the peripheries of the rollers (*b*) as clearly shown in Fig. 2. The front wheels therefore when cramped are prevented from prying up the body of the vehicle and causing it to upset and much friction is avoided by the roller.

The ordinary cramps are merely metal strips secured to the bottom of the body to prevent the wearing or abrasion of the same, and much friction is created by the front wheels bearing against them.

Having thus described my invention what I claim as new and desire to secure by Letters Patent, is

Constructing the cramps D with anti-friction rollers (*b*) said rollers being provided with flanges (*c*) and having such a position that the peripheries of the tires and the sides of the fellies of the front wheel will when the front wheels are cramped bear against the rollers in the manner as herein shown and described.

SAMUEL T. SANFORD.

Witnesses:
THOMAS S. LINDSEY,
WILLIAM C. EWING.